(12) United States Patent
Cohen et al.

(10) Patent No.: US 11,016,789 B2
(45) Date of Patent: May 25, 2021

(54) ROBOT BROWSER EMBEDDING

(71) Applicant: UiPath, Inc., New York, NY (US)

(72) Inventors: Evan Cohen, Seattle, WA (US); Ankit Saraf, Bellevue, WA (US); Naren Venkateswaran, Bengaluru (IN); Sankara Narayanan Venkataraman, Bengaluru (IN)

(73) Assignee: UiPath, Inc., New York, NY (US)

( * ) Notice: Subject to any disclaimer, the term of this patent is extended or adjusted under 35 U.S.C. 154(b) by 39 days.

(21) Appl. No.: 16/706,581

(22) Filed: Dec. 6, 2019

(65) Prior Publication Data

US 2021/0109767 A1    Apr. 15, 2021

(30) Foreign Application Priority Data

Oct. 11, 2019  (IN) .............................. 201911041286

(51) Int. Cl.
*G06F 9/445* (2018.01)
*G06F 21/44* (2013.01)
(Continued)

(52) U.S. Cl.
CPC .......... *G06F 9/44521* (2013.01); *G06F 9/485* (2013.01); *G06F 9/541* (2013.01); *G06F 21/44* (2013.01)

(58) Field of Classification Search
CPC ...... G06F 9/44521; G06F 9/485; G06F 9/541; G06F 21/44
See application file for complete search history.

(56) References Cited

U.S. PATENT DOCUMENTS

| | | |
|---|---|---|
| 7,590,680 B2 | 9/2009 | Fernando et al. |
| 2014/0122291 A1 | 5/2014 | Sampathkumaran et al. |

(Continued)

FOREIGN PATENT DOCUMENTS

| | | |
|---|---|---|
| EP | 2889709 A2 | 7/2015 |
| EP | 3543837 A1 | 9/2019 |
| JP | 6532626 B1 | 6/2019 |

OTHER PUBLICATIONS

"Robotic Process Automation and Low-Code: A Practical Tutorial on Integrating UiPath with Joget".

(Continued)

*Primary Examiner* — Emerson C Puente
*Assistant Examiner* — Jonathan R Labud
(74) *Attorney, Agent, or Firm* — LeonardPatel PC

(57) ABSTRACT

One or more robots may be invoked from one or more applications for robotic process automation (RPA). A process for invoking a robot from an application may include launching the application from a computing system to invoke a robot link embedded within the application. The process may also include initiating from the application a port discovery process to identify a port, port details, and a token. The process may further include generating by the application a randomized code and invoking a consent application requesting approval from a user of the computing system to invoke the robot from the application. The process may also include registering the randomized code with a local listener module and passing user information and the token to a global listener module. The process may further include receiving from the global listener module the token and port identification, allowing the application to authenticate itself with, and communicate with, the robot, thereby completing the robot invoking process.

21 Claims, 10 Drawing Sheets

(51) Int. Cl.
    *G06F 9/48*     (2006.01)
    *G06F 9/54*     (2006.01)

(56)                  References Cited

U.S. PATENT DOCUMENTS

| | | | |
|---|---|---|---|
| 2017/0052824 A1 | 2/2017 | Sharma et al. | |
| 2017/0173784 A1 | 6/2017 | Shah et al. | |
| 2017/0352041 A1* | 12/2017 | Ramamurthy | G06F 40/226 |
| 2018/0345489 A1* | 12/2018 | Allen, IV | G05B 19/0421 |
| 2019/0057203 A1 | 2/2019 | Buddhiraju et al. | |
| 2019/0130094 A1* | 5/2019 | Votaw | G06F 21/44 |
| 2019/0141125 A1* | 5/2019 | Ogrinz | H04L 67/306 |
| 2019/0171845 A1 | 6/2019 | Dotan-Cohen et al. | |
| 2020/0067923 A1* | 2/2020 | Dasari | G06F 21/45 |

OTHER PUBLICATIONS

International Search Report & Written Opinion, dated Dec. 3, 2020, PCT Application No. PCT/US20/48695.

* cited by examiner

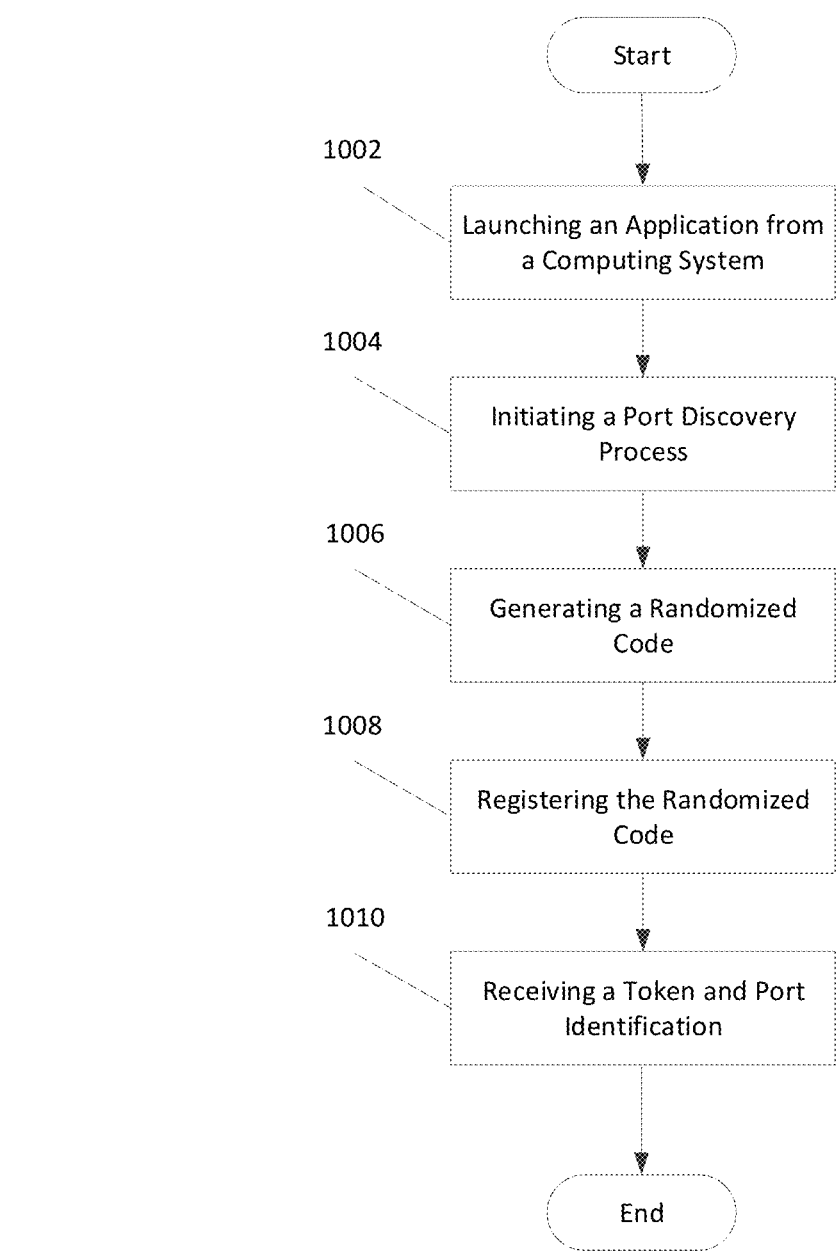

ROBOT BROWSER EMBEDDING

PRIORITY TO FOREIGN APPLICATION

This application claims the benefit of, and priority under 35 U.S.C. § 119, to Indian Patent Application No. 201911041286 filed Oct. 11, 2019. The subject matter of this earlier filed application is hereby incorporated by reference in its entirety.

FIELD

The present invention generally relates to robotic process automation (RPA), and more specifically, invoking robot processes from one or more applications for RPA.

BACKGROUND

Robots running on a local machine are generally invoked by a robot tray or a conductor application programming interface (API). In either case, the user invokes the robot by way of the robot tray or the conductor API. However, when the user is working on one or more different applications, the user is unable to physically invoke the robot(s).

Thus, it may be beneficial to invoke one or more robots without reaching the robot tray or the conductor API.

SUMMARY

Certain embodiments of the present invention may provide solutions to the problems and needs in the art that have not yet been fully identified, appreciated, or solved by RPA techniques. For example, some embodiments of the present invention pertain to invoking one or more robot processes from one or more applications.

In an embodiment, a computer-implemented method includes launching an application from the computing system to invoke a robot link embedded within the application. The method may also include initiating from the application a port discovery process to identify a port, port details, and a token. The method may further include generating by the application a randomized code and invoking a consent application requesting approval from a user of the computing system to invoke the robot from the application, as well as registering the randomized code with a local listener module and passing user information and the token to a global listener module. The method may also include receiving from the global listener module the token and port identification, allowing the application to authenticate itself with, and communicate with, the robot, thereby facilitating robot interaction processes.

In another embodiment, a computer program is embodied on a non-transitory computer-readable medium. The computer program is configured to cause at least one processor to launch an application from the computing system to invoke a robot link embedded within the application. The computer program is further configured to cause at least one processor to initiate from the application a port discovery process to identify a port, port details, and a token. The computer program is also configured to cause at least one processor to initiate generate by the application a randomized code and invoking a consent application requesting approval from a user of the computing system to invoke the robot from the application. Additionally, the computer program is further configured to cause at least one processor to register the randomized code with a local listener module and passing user information and the token to a global listener module, and receive from the global listener module the token and port identification, allowing the application to authenticate itself with, and communicate with, the robot, thereby facilitating robot interaction processes.

In yet another embodiment, a system includes memory storing computer program instructions and at least one processor configured to execute the computer program instructions. The instructions are configured to cause the at least one processor to launch an application from the computing system to invoke a robot link embedded within the application. The instructions are further configured to cause the at least one processor to initiate from the application a port discovery process to identify a port, port details, and a token, and generate by the application a randomized code and invoking a consent application requesting approval from a user of the computing system to invoke the robot from the application. The instructions are also configured to cause the at least one processor to register the randomized code with a local listener module and passing user information and the token to a global listener module, and receive from the global listener module the token and port identification, allowing the application to authenticate itself with, and communicate with, the robot, thereby facilitating robot interaction processes.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 10 is a flow diagram illustrating a process for facilitating robot interaction processes, according to an embodiment of the present invention.

DETAILED DESCRIPTION OF THE EMBODIMENTS

Some embodiments pertain to invoking one or more robots from one or more applications for robotic process automation (RPA). Applications may be defined as any application on the machine, which can be embedded on a browser or run Hypertext Markup Language (HTML) and JavaScript (JS) code. In other words, applications are not limited to "web-based applications", and may be any application that can be used to invoke a robot. For purposes of explanation, the term "application" will be used. In certain embodiments, the application, which may be used to invoke the robot, may be from an untrusted domain. In some embodiments, robot links are embedded into the one or more applications, allowing for the one or more robots to be invoked. In an embodiment, a user of a computing system launches an application to invoke the robot link embedded within the application. From the application, a port discovery process may be initiated to identify the port, the port details, and a token. The application may then generate a randomized code and invoke a consent application requesting approval from a user of the computing system to invoke the robot from the application. The randomized code may be registered with a local listener module, and the user information and token may be forwarded to a global listener module. The token and port identification may be received from the global listener module, allowing the application to authenticate itself and communicate with the robot.

Figure 1:
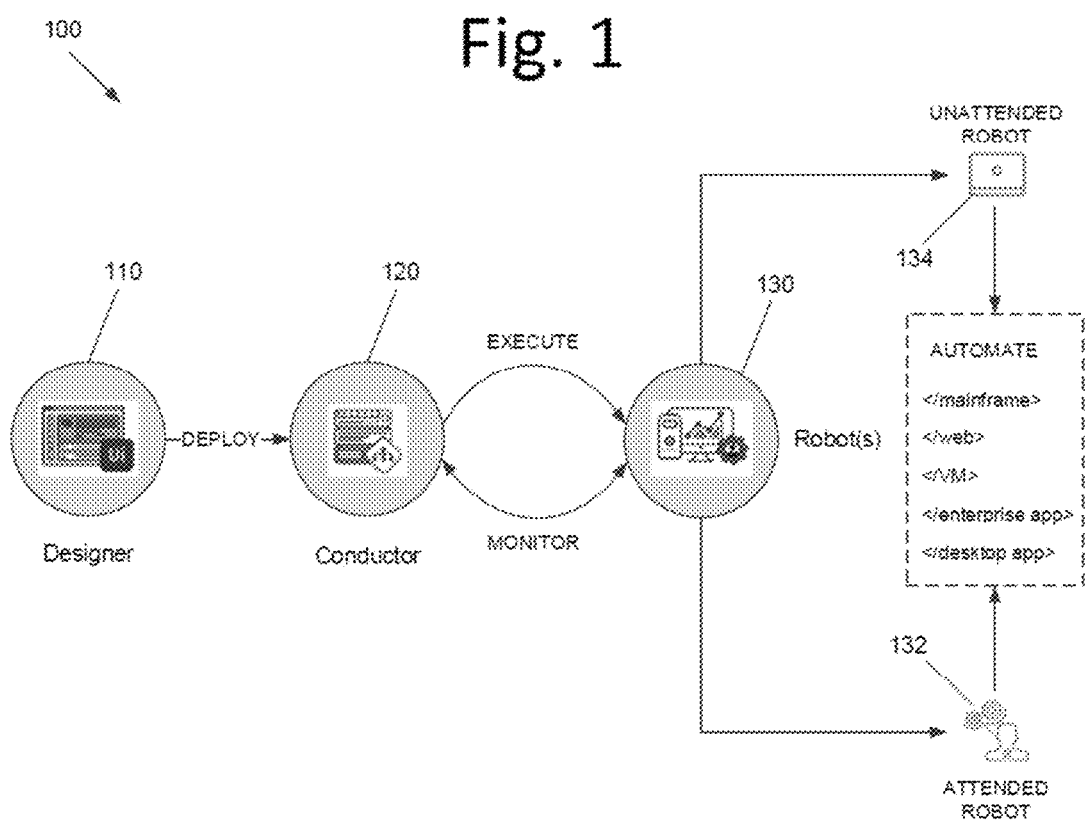
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
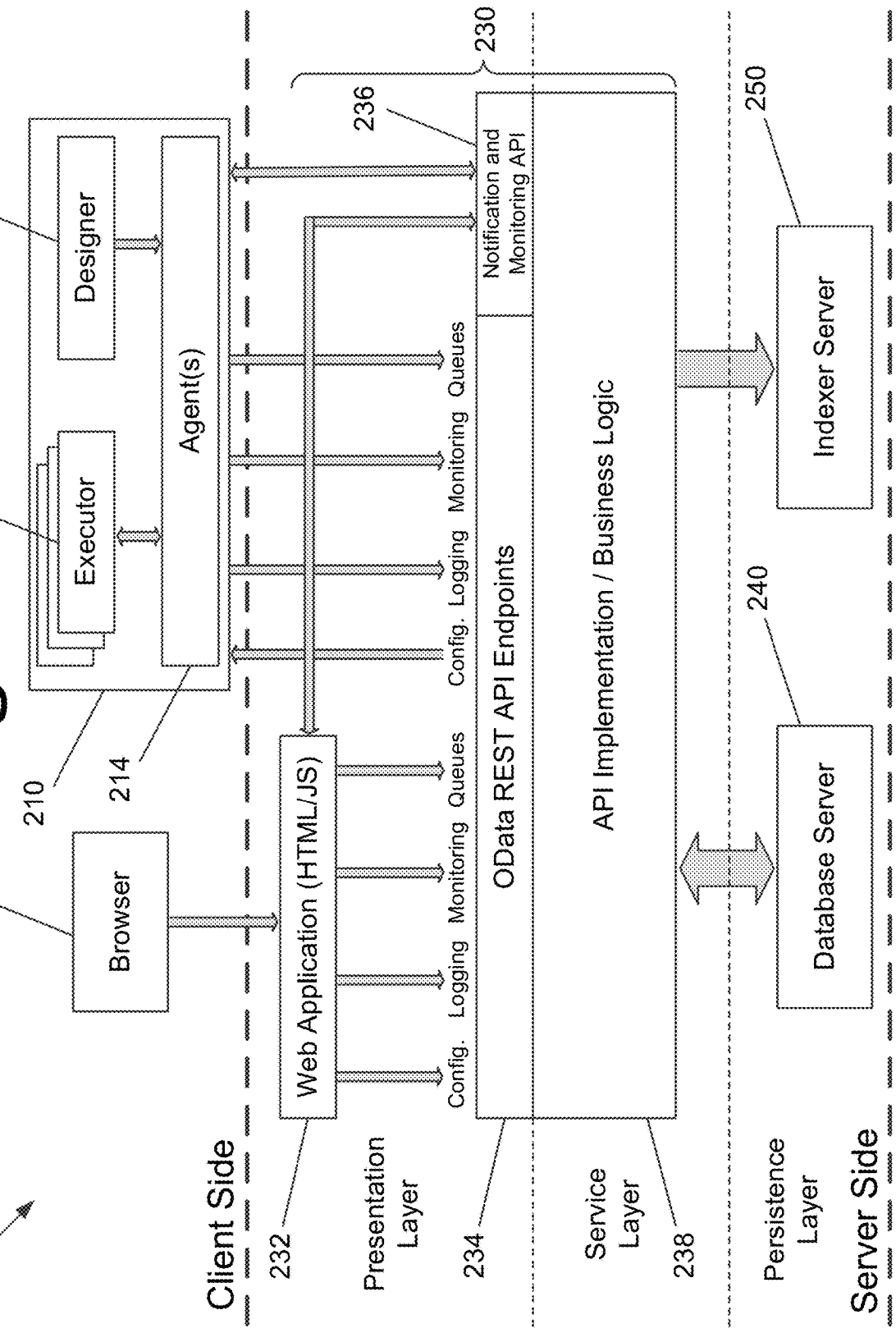
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In certain embodiments, designer 216 is used to setup input and output on the processes. These inputs and outputs may be handled by executors 212 via agent 214. Further, the inputs and outputs form a mechanism to communicate with the workflow during initialization and receive the results during or after completion of the execution.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses HTML and JS. However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
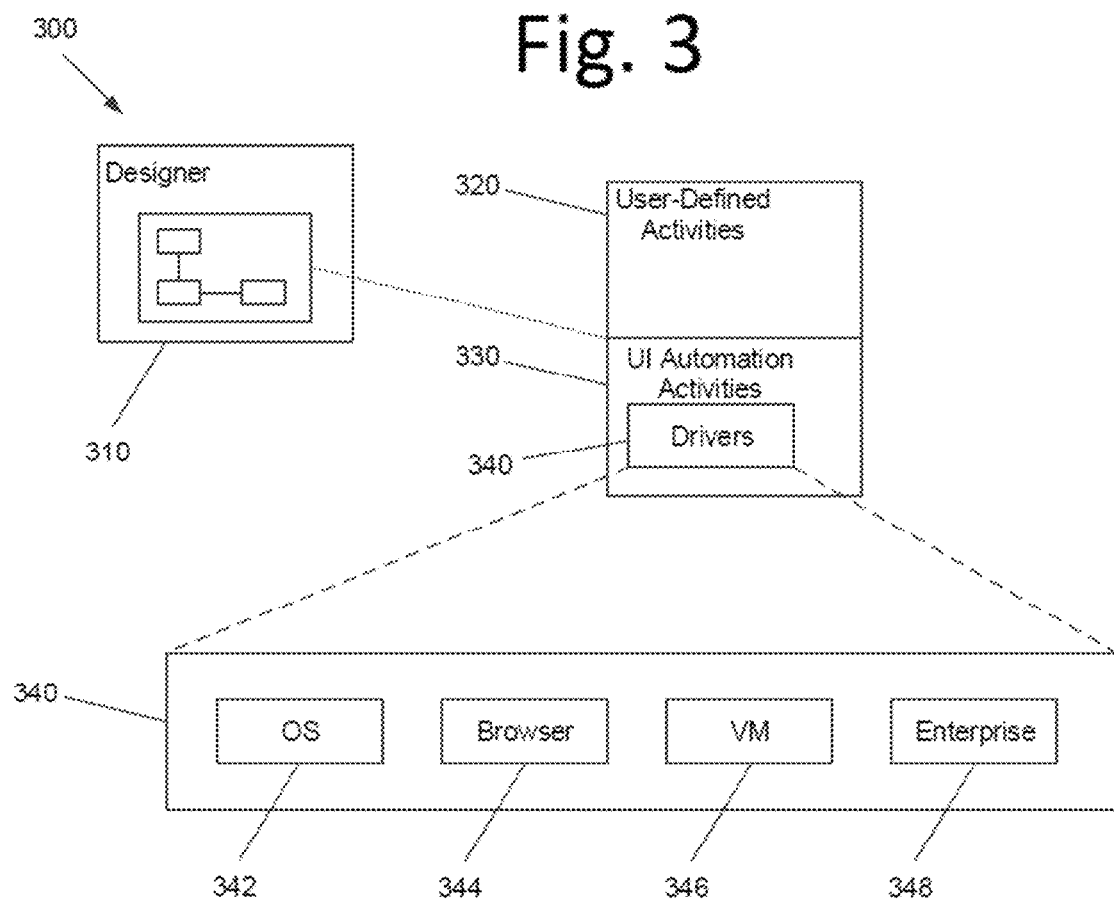
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some computer vision (CV) activities may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, Citrix®, SAP®, etc. For instance, the "click" activity performs the same role in these different applications via drivers 340.

Figure 4:
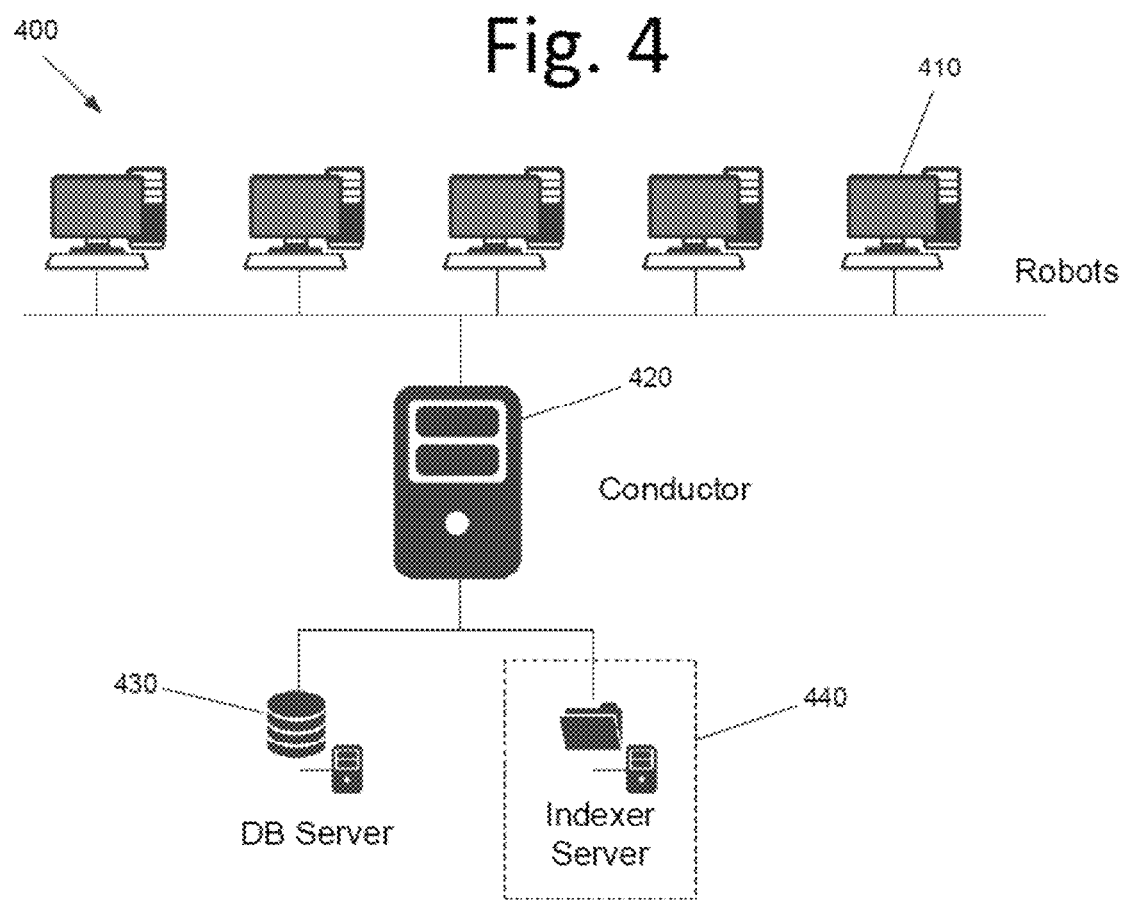
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
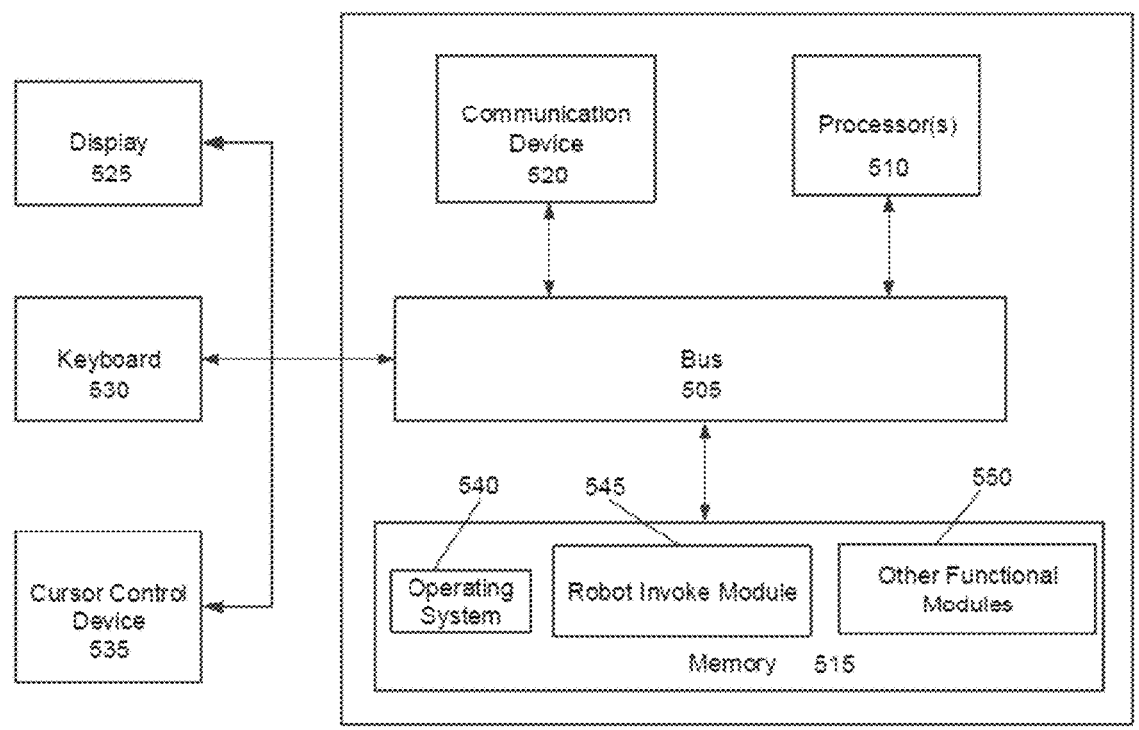
FIG. 5 is an architectural diagram illustrating a computing system configured to invoke a robot from an application, according to an embodiment of the present invention.

FIG. 5 is an architectural diagram illustrating a computing system 500 configured to invoke a robot from one or more applications, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a robot invoke module 545 that is configured to perform all of, or part of, the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
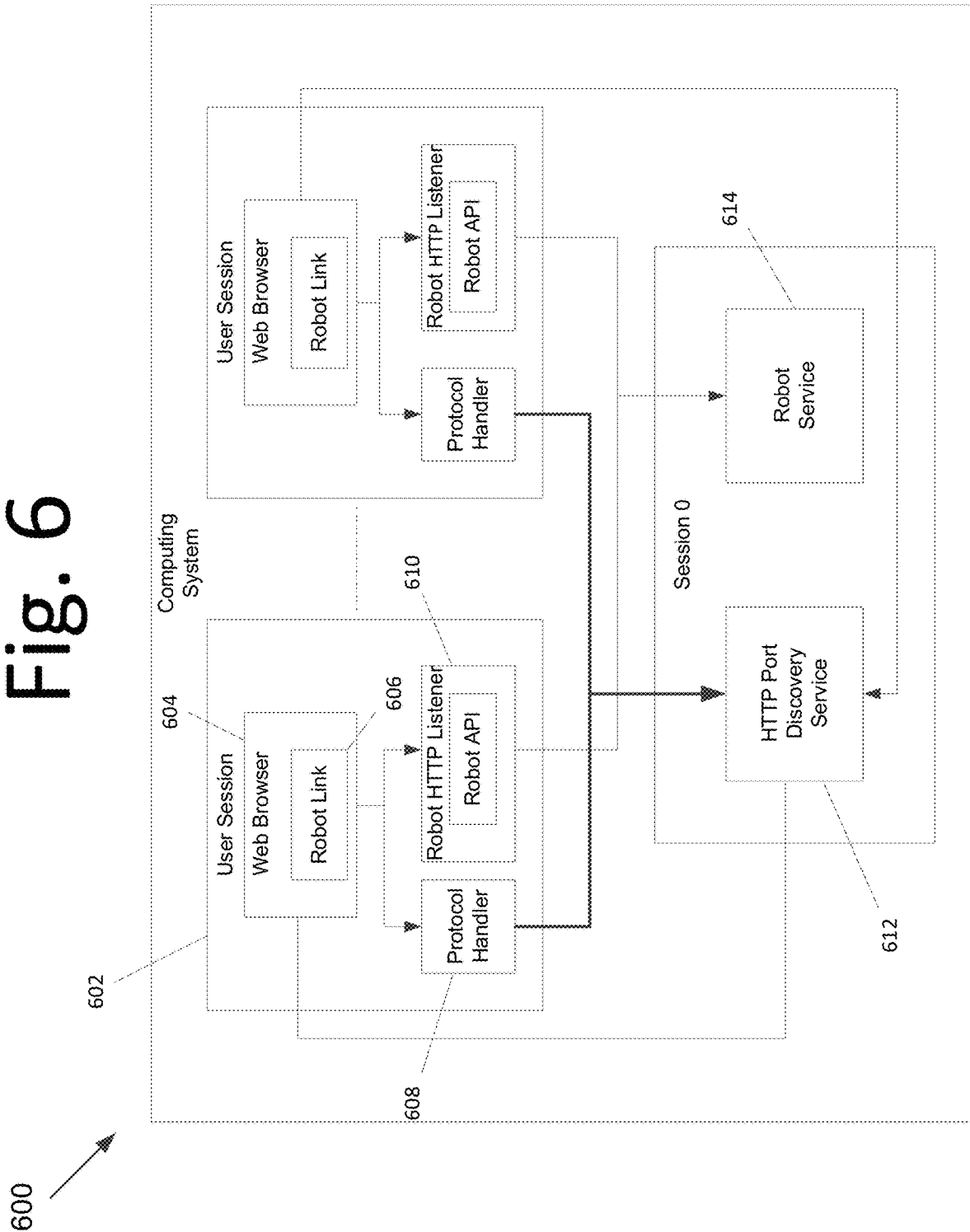
FIG. 6 is a block diagram illustrating a desktop configuration for communicating between one or more sessions and the robot tray, according to an embodiment of the present invention.

FIG. 6 is a block diagram illustrating a desktop configuration 600 of a computing system for communicating between one or more user sessions 602 and the robot tray, according to an embodiment of the present invention. Although a single user session 602 will be referred to in this example, there may be multiple sessions being executed on desktop configuration 600.

In some embodiments, user session 602 includes an application running on a web browser 604. The application is embedded with a robot (e.g., via a JavaScript (JS) standard development kit (SDK)) link 606. Robot link 606 provides the user with the ability to invoke the robot from the application without reaching the robot tray. In certain embodiments, robot link 606 is JS based SDK and is responsible for simplifying the port discovery, authentication, interaction and communication flows between the application and the protocol handler 608, hypertext transfer protocol (HTTP) listener 610, and HTTP port discovery service 612. In an embodiment where the application decides to not use robot link 606, the application may directly interact with protocol handler 608, HTTP listener 610, and HTTP port discovery service 612.

To invoke the robot, the user launches a application through which the robot is accessed, causing robot link 606 embedded within the application to invoke the robot. A protocol handler 608, also referred to as a custom protocol handler application or consent application, allows the user to authenticate user session 602. In some embodiments, computing systems 600 allows custom protocol handlers (also known as custom URI schemes) to be registered on the machine, which can launch a particular application when invoked from anywhere on the machine. For example, http:// launches the browser or mailto:// launches the email client. Protocol handler 608, in some embodiments, on installation may register a custom protocol handler. This protocol may be used to invoke it.

HTTP port discovery service 612, also referred to as a global listener module, performs port discovery in "Session 0" to provide dynamic allocation of ports. It should be appreciated that these embodiments are not limited to HTTP protocols, and other communications channels or protocols may be used. In some embodiments, HTTP port discovery service 612 operates on a well-known port on computer system 600. This well-known port is known to robot link 606 and is used to retrieve an authentication token and port discovery of robot HTTP listener 610. It should be appreciated that these embodiments are not limited to HTTP listener, and other protocols aside from HTTP may be used. HTTP port discovery service 612 may be set to automatically start when computing system 600 boots or when a user logs into computing system 600. This way, HTTP port discovery service 612 is always available.

Additionally, in some embodiments, protocol handler 608 may also start HTTP port discovery service 612 if HTTP port discovery service 612 is not already running. In those embodiments, protocol handler 608 may have elevated permission (or admin rights) to start HTTP port discovery. Since multiple user sessions are running on computing system 600, HTTP port discovery service 612 may be started in a machine session (or session 0 in windows) to ensure that robot HTTP listener 610, protocol handler 608 and robot link 606 from all user sessions are able to access HTTP port discovery service 612.

In some embodiments, HTTP port discovery service 612 may be running directly in user session 602. In those embodiments, HTTP port discovery service 612 and robot HTTP listener 610 is combined in a single service. Also, in these embodiments, HTTP port discovery service 612 may not be required, since robot link 606 is aware of well-known port of HTTP listener 610.

Referring back to user session 602, Robot HTTP Listener (or local listener module) 610, facilitates communication between the application via robot link 606 and the robot tray. Robot HTTP listener 610 is responsible for web browser 604 interacting with robot service 614 to run processes and send/receive data from executors 212 of robot 210. Robot HTTP listener 610 may provide HTTP APIs that are used by robot link 606. Since computing system 600 has multiple user sessions running on it, and to provide security between the different users on the same computing system 600, robot HTTP listener 610 runs within a user session 602 and communicates with robot service 614 on behalf of the specific user. Robot HTTP listener 610 may start automatically communicating with robot service 614 when user session 602 starts or when started by protocol handler 608. Since a single HTTP port on a computer can only be used by a single robot HTTP listener 610 on Windows®, robot HHTP listener 610 service starts on a random port every time to avoid conflict when multiple user sessions that are active on the same machine. On every start, robot HTTP listener 610 registers it's selected port and user session under which it is running with HTTP port discovery service 612. This allows HTTP port discovery service 612 to provide the port number to robot link 606 to communicate after port discovery process.

It should be appreciated that both HTTP port discovery service 612 and robot HTTP listener 610 may be configured to listen on localhost or 127.0.0.1 to prevent other external machines from communicating with these services. These guarantees are provided by operating systems.

Robot service is agent 214 from FIG. 2 and is responsible for managing executors 212 as described above.

Certain embodiments may include a port discovery process, an authentication process, and a robot service interaction. It should be appreciated that in certain embodiments both port discovery and authentication processes can be combined into a single flow but there is no requirement to do. In other embodiments, both of these processes can be executed separately.

It should be further appreciated that communication between HTTP listener 610, protocol handler 608, HTTP port discovery service 612 and robot service 614 use a secure authenticated application to application and/or authenticated service to service channels provided by the operating system (e.g., NTLM authentication).

Port Discovery Process

Figure 7:
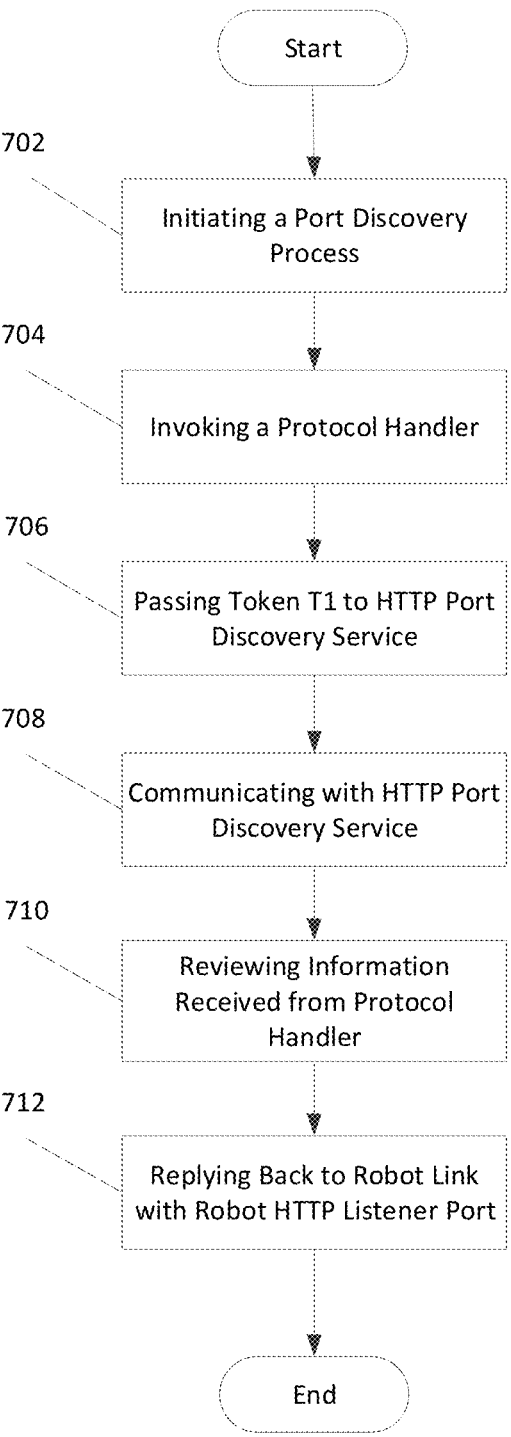
FIG. 7 is a flow diagram illustrating a port discovery process, according to an embodiment of the present invention.

FIG. 7 is a flow diagram illustrating a port discovery process 700, according to an embodiment of the present invention. Since robot HTTP listener 610 is configured to start on any random port that is not in use, robot link 606 initiates port discovery process 700 to discover the port of robot HTTP listener 610 before robot link 606 can communicate with the port.

In an embodiment, process 700 begins at 702 with initiating a port discovery process when the application uses an API from robot link 606 and when robot link 606 is unaware of the port. At 704, robot link 606 uses a custom protocol handler to invoke protocol handler 608 while passing token T1. This ensures that protocol handler 608 is invoked for the current user and not for any other user session on that machine.

At 706, protocol handler 608 passes token T1 to HTTP port discovery service 612. Protocol handler 608 also passes information about which user session it was running under (e.g., session 0). Protocol handler 608 may also activate robot HTTP listener service 610 and HTTP port discovery service 612 when robot HTTP listener service 610 and HTTP port discovery service 612 are not running.

At 708, robot link 606 also communicates with HTTP port discovery service 612, providing the token T1 and requesting HTTP port discovery service 612 to provide the port of robot HTTP listener 610 for which it should communicate it.

At 710, HTTP port discovery service 612 reviews the information received from protocol handler 608 identifying which user the token T1 belongs to and then uses the list of registered ports to identify the port of robot HTTP listener 610 for that particular user. At 712, HTTP port discovery service 612 replies back to robot link 606 with the port of robot HTTP listener 610 that it should communicate with, thereby completing the port discovery process.

Authentication

Figure 8:
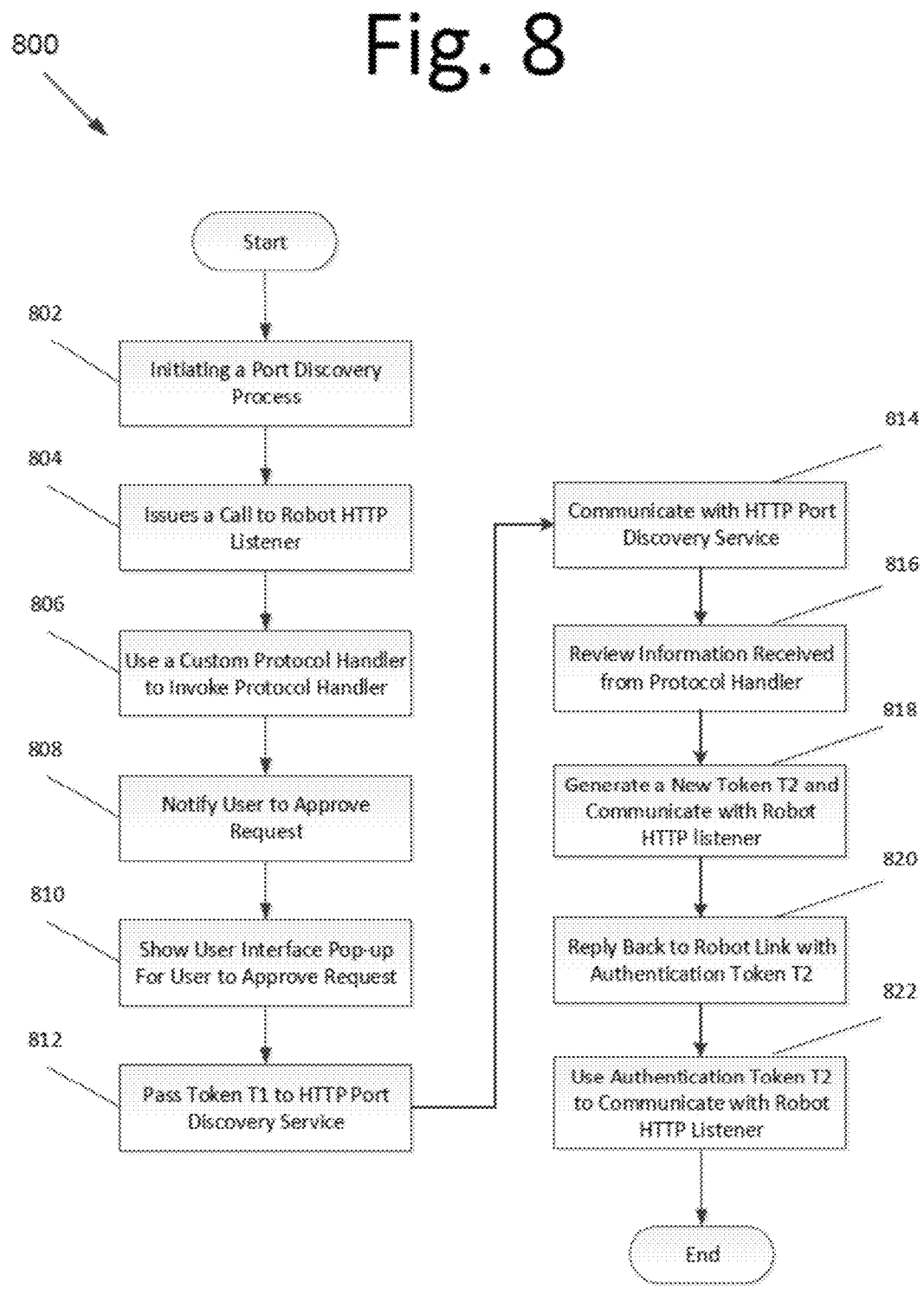
FIG. 8 is a flow diagram illustrating an authentication process, according to an embodiment of the present invention.

FIG. 8 is a flow diagram illustrating an authentication process 800, according to an embodiment of the present invention. When robot HTTP listener 610 runs on a HTTP port on computing system 600, any software running on computing system 600, even on behalf of another user, may access the HTTP port. This may result in a security risk, i.e., another user or software running on computing system 600 can invoke robot processes on behalf of the users. To mitigate this risk, every call into robot HTTP listener 610 is authenticated and authorized before the call is accepted. This forces robot link 606 to retrieve an authentication token for robot HTTP listener 610 before robot link 606 can communicate with it.

In some embodiments, process 800 begins at 802 with initiating a port discovery process when the application uses any API from robot link 606, and when robot link 606 does not know the port. At 804, after the port discovery process is completed, robot link 606 issues a call to robot HTTP listener 610. If the robot HTTP listener 610 does not receive any token or a valid token, robot HTTP listener 610 rejects the call from robot link 606.

When the call is rejected, robot link 606 needs to get authenticated and authorized using a valid token prior to calling robot HTTP listener 610 for a second time. Because of this, at 806, robot link 606 uses a custom protocol handler to invoke protocol handler 608 while passing token T1. This ensures that protocol handler 608 is invoked for the current user and not for another user on another session on the same computing system 600. In some optional embodiments, at 808, robot link 606 also shows a prompt on application notifying the user to approve the request with token T1.

At 810, once invoked, protocol handler 608 shows a user interface (UI) pop-up for the user to approve the request from robot link 606. In certain embodiments, the token T1 may also be shown to help the user validate the request, i.e., verifying that the request came from a specific robot link 606 or application, and the request is not coming from another application or user on computing system 600.

At 812, once the user approves the request, protocol handler 608 passes token T1 to HTTP port discovery service 612, and also, passes information about which user session it was running under. Protocol handler 608 may also start the robot HTTP listener 610 and HTTP port discovery service 612 if they were not running at this point.

At 814, robot link 606 also communicates with HTTP port discovery service 612, providing HTTP port discovery service 612 with the token T1 and requesting HTTP port discovery service 612 to provide authentication token T2 for communication with robot HTTP listener 610. At 816, HTTP port discovery service 612 reviews the information received from protocol handler 608 to identify which user the token T1 belongs to. The HTTP port discovery service 612 also uses a list of registered services to identify the robot HTTP listener 610 for that particular user. At 818, HTTP port discovery service 612 generates a new token T2 and communicates token T2 to robot HTTP listener 610 as a valid token for authentication. The token T2 may include additional information such as the domain for which it is registered, its creation time, its expiry time, etc., to help with authentication flow. At 820, HTTP port discovery service 612 replies back to robot link 606 with the authentication token T2 for the robot HTTP listener 610 that it was requesting for. At 822, robot link 606 can now use the authentication token T2 to communicate with robot HTTP listener 610, thereby completing the authentication process.

In certain embodiments, the authentication token T2 may also be generated by protocol handler 608 and may communicate with both HTTP port discovery service 612 and robot HTTP listener 610, instead of the authentication token T2 being generated by HTTP port discovery service 612.

Robot Service Interaction

Certain embodiments provide robot HTTP listener 610 with various capabilities offered by robot service 614. For example, robot HTTP listener 610 may query executor 212 or the status of robot 210, may connect and/or disconnect from conductor 230, list the processes available on robot 210, start, stop, pause, terminate, etc., a process on robot 210, query the status of a process running or executed on robot 210, and/or send and/or receive data while starting a process, already executing the process or when the process completes execution. Specifically, some embodiments may enable applications to invoke RPA to fetch and/or send data from a local machine.

Figure 9:
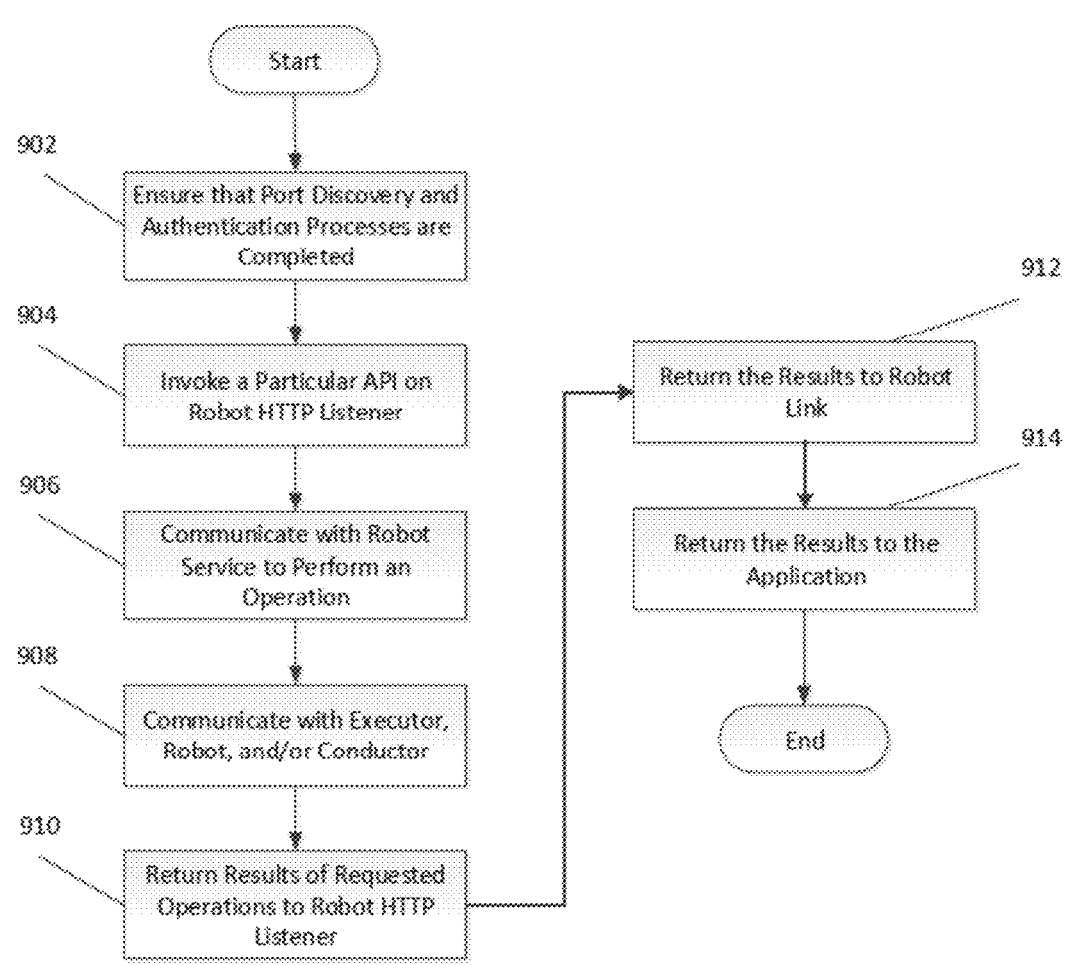
FIG. 9 is a flow diagram illustrating a robot service interaction process, according to an embodiment of the present invention.

FIG. 9 is a flow diagram illustrating a robot service interaction process 900, according to an embodiment of the present invention. In some embodiments, the application uses robot link 606 to interact with robot service 614. In these embodiments, application may invoke any of the supported APIs/functions/operation provided by robot link 606.

In some embodiments, process 900 begins at 902 with robot link 606 ensuring that port discovery and authentication is completed when the applications invoke any of the supported APIs/functions/operation. At 904, robot link 606 invokes a particular API on robot HTTP listener 610 over HTTP. Robot HTTP listener 610 at 906 communicates with robot service 614 to perform the operation requested by robot link 606. At 908, robot service 614 communicates with executor 212, robot 210, conductor 230 or any other application as required to fulfill the requested operation. At 910, robot service 614 returns the results of the requested operation back to robot HTTP listener 610, and at 912, robot HTTP listener 610 returns the results back to robot link 606. At 914, robot link 606 returns the data back to the application.

FIG. 10 is a flow diagram illustrating a process 1000 for facilitating robot interaction processes, according to an embodiment of the present invention. In this embodiment, process 1000 begins at 1002 with launching an application from the computing system to invoke a robot link embedded within the application, and at 1004, with initiating from the application a port discovery process to identify a port, port details, and a token. At 1006, process 1000 continues with generating by the application a randomized code and invoking a consent application requesting approval from a user of the computing system to invoke the robot from the application. At 1008, process 1000 further performs registering the randomized code with a local listener module and passing user information and the token to a global listener module, and at 1010, process 1000 performs receiving from the global listener module the token and port identification, allowing the application to authenticate itself with, and communicate with, the robot, thereby facilitating robot interaction processes.

It should be appreciated that the application with the embedded robot link may be built in a local application development platform, and may be connected with both attended and unattended robots. In certain embodiments, the application may be used as a ".exe" file that runs on a computing system's desktop and is not part of the web browser. In some further embodiments, the application may be docked to a screen so the application can communicate with other applications simultaneously.

The process steps performed in FIGS. 7-10 may be performed by a computer program, encoding instructions for the processor(s) to perform at least part of the process described in FIGS. 7-10, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7-10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    launching an application from the computing system to invoke a robot link embedded within the application;
    initiating from the application a port discovery process to identify a port, port details, and a token;
    generating by the application a randomized code and invoking a consent application requesting approval from a user of the computing system to invoke the robot from the application;
    registering the randomized code with a local listener module and passing user information and the token to a global listener module; and
    receiving from the global listener module the token and port identification, allowing the application to authenticate itself with, and communicate with, the robot, thereby facilitating robot interaction processes.

2. A computer-implemented method of claim 1, wherein the application used to invoke the robot link is from an untrusted domain.

3. The computer-implemented method of claim 1, wherein the facilitating of the robot interaction processes comprises
    invoking by the robot link a particular application programming interface (API) on a robot listener module over a communication medium.

4. The computer-implemented method of claim 3, wherein the robot listener module is configured to query executor or a status of the robot, connect, disconnect, or both, from a conductor, list available processes available on the robot, start, stop, pause, and/or terminate a process on the robot, query a status of a process running or executed on the robot, and/or send and/or receive data while starting a process, already executing the process or when the process completes execution.

5. The computer-implemented method of claim 3, wherein the facilitating of the robot interaction processes further comprises
    communicating by the robot listener module with a robot service to perform an operation requested by the robot link.

6. The computer-implemented method of claim 5, wherein the facilitating of the robot interaction processes further comprises
    communicating by the robot service with an executor, a robot, and/or conductor to fulfill the requested operation.

7. The computer-implemented method of claim 6, wherein the facilitating of the robot interaction processes further comprises
    returning from the robot service to the application results of the requested operation by way of the robot listener and the robot link.

8. A computer program embodied on a non-transitory computer-readable medium, the computer program configured to cause at least one processor to
    launch an application from the computing system to invoke a robot link embedded within the application;
    initiate from the application a port discovery process to identify a port, port details, and a token;
    generate by the application a randomized code and invoking a consent application requesting approval from a user of the computing system to invoke the robot from the application;

register the randomized code with a local listener module and passing user information and the token to a global listener module; and receive from the global listener module the token and port identification, allowing the application to authenticate itself with, and communicate with, the robot, thereby facilitating robot interaction processes.

9. The computer program of claim 8, wherein the application used to invoke the robot link is from an untrusted domain.

10. The computer program of claim 8, wherein the computer program is further configured to cause at least one processor to invoke by the robot link a particular application programming interface (API) on a robot listener module over a communication medium.

11. The computer program of claim 10, wherein the robot listener module is configured to query executor or a status of the robot, connect, disconnect, or both, from a conductor, list available processes available on the robot, start, stop, pause, and/or terminate a process on the robot, query a status of a process running or executed on the robot, and/or send and/or receive data while starting a process, already executing the process or when the process completes execution.

12. The computer program of claim 11, wherein the computer program is further configured to cause at least one processor to communicate by the robot listener module with a robot service to perform an operation requested by the robot link.

13. The computer program of claim 12, wherein the computer program is further configured to cause at least one processor to communicate by the robot service with an executor, a robot, and/or conductor to fulfill the requested operation.

14. The computer program of claim 13, wherein the computer program is further configured to cause at least one processor to return from the robot service to the application results of the requested operation by way of the robot listener and the robot link.

15. A computing system, comprising:

memory storing machine-readable computer program instructions; and at least one processor configured to execute the computer program instructions, the instructions configured to cause the at least one processor to:

launch an application from the computing system to invoke a robot link embedded within the application;

initiate from the application a port discovery process to identify a port, port details, and a token;

generate by the application a randomized code and invoking a consent application requesting approval from a user of the computing system to invoke the robot from the application;

register the randomized code with a local listener module and passing user information and the token to a global listener module; and receive from the global listener module the token and port identification, allowing the application to authenticate itself with, and communicate with, the robot, thereby facilitating robot interaction processes.

16. A computing system of claim 15, wherein the application used to invoke the robot link is from an untrusted domain.

17. The computing system of claim 15, wherein the instructions are further configured to cause the at least one processor to:

invoke by the robot link a particular application programming interface (API) on a robot listener module over a communication medium.

18. The computer-implemented method of claim 17, wherein the robot listener module is configured to query executor or a status of the robot, connect, disconnect, or both, from a conductor, list available processes available on the robot, start, stop, pause, and/or terminate a process on the robot, query a status of a process running or executed on the robot, and/or send and/or receive data while starting a process, already executing the process or when the process completes execution.

19. The computing system of claim 18, wherein the instructions are further configured to cause the at least one processor to:

communicate by the robot listener module with a robot service to perform an operation requested by the robot link.

20. The computing system of claim 19, wherein the instructions are further configured to cause the at least one processor to:

communicate by the robot service with an executor, a robot, and/or conductor to fulfill the requested operation.

21. The computing system of claim 20, wherein the instructions are further configured to cause the at least one processor to:

return from the robot service to the application results of the requested operation by way of the robot listener and the robot link.

\* \* \* \* \*